June 13, 1950 — L. J. SCHINNERER — 2,511,298
BROACHING TOOL
Filed Feb. 21, 1946 — 2 Sheets-Sheet 1
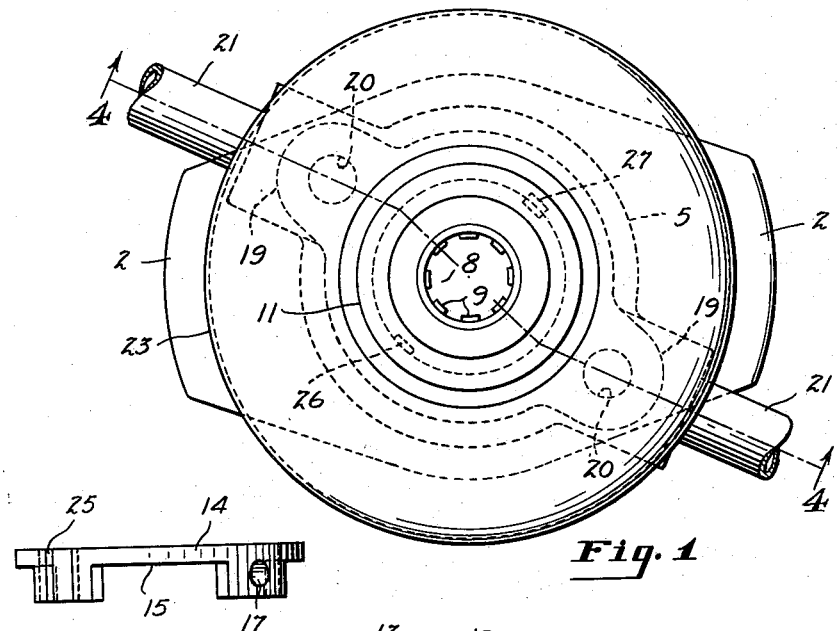
Fig. 1
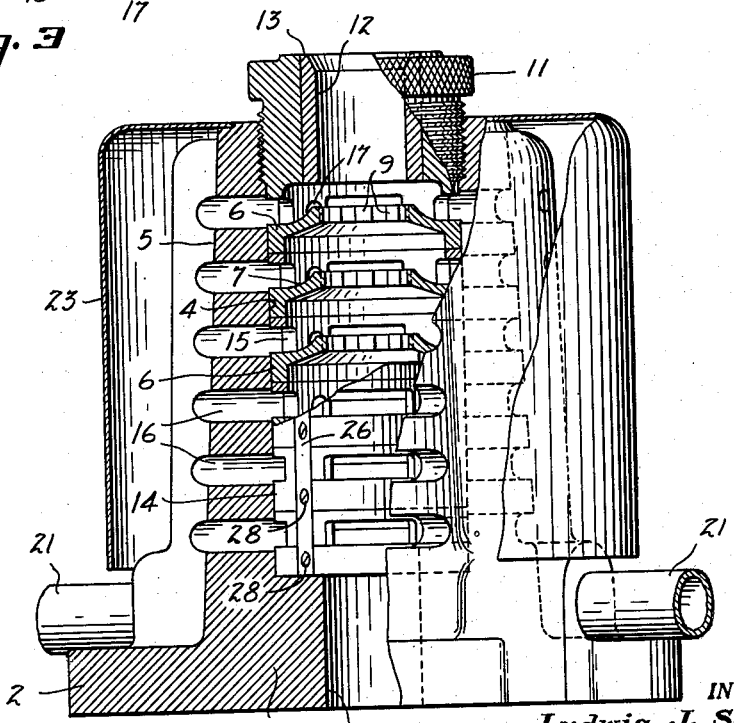
Fig. 3
Fig. 2
INVENTOR.
Ludwig J. Schinnerer
BY
Evans + McCoy
ATTORNEYS June 13, 1950 L. J. SCHINNERER 2,511,298
BROACHING TOOL
Filed Feb. 21, 1946 2 Sheets-Sheet 2

INVENTOR.
Ludwig J. Schinnerer
BY
Evans + McCoy
ATTORNEYS

Patented June 13, 1950

2,511,298

UNITED STATES PATENT OFFICE 2,511,298

BROACHING TOOL

Ludwig J. Schinnerer, Lakewood, Ohio, assignor to Cleveland Steel Products Corporation, Cleveland, Ohio, a corporation of Ohio Application February 21, 1946, Serial No. 649,305

8 Claims. (Cl. 29—95.1)

This invention relates to broaching machines and more particularly to machines for cutting external longitudinal spline grooves in shafts.

The invention has for an object to provide a broaching machine that has a stack of annular internally toothed broaches which are rigidly supported in spaced relation and in axial alinement so as to provide cooling chambers of substantial capacity between them and having means for creating relatively rapid flow of liquid coolant through each of the chambers in order to effectively cool both the broaches and the work and to carry away the chips cut by the broaches.

A further object is to provide a broach holder in which the broaches are rigidly supported in axial alinement with an elongated shaft guide so positioned with respect to the broaches as to prevent bending of the shaft as it is forced by endwise pressure through the broaches.

An additional object of the invention is to provide cooling chambers that have tangentially disposed liquid inlet openings so that the entering liquid under pressure has a whirling motion in the chamber and large lateral discharge openings through which the liquid coolant carrying the chips cut from the work can freely discharge.

With the above and other objects in view, the invention may be said to comprise the broaching machines as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which:

Fig. 1 is a top plan view of a broach holder and broach assembly embodying the invention;

Fig. 2 is a view partly in side elevation and partly in vertical axial section showing the broach holder and assembly;

Fig. 3 is a side elevation of one of the spacing rings;

Figure 4:
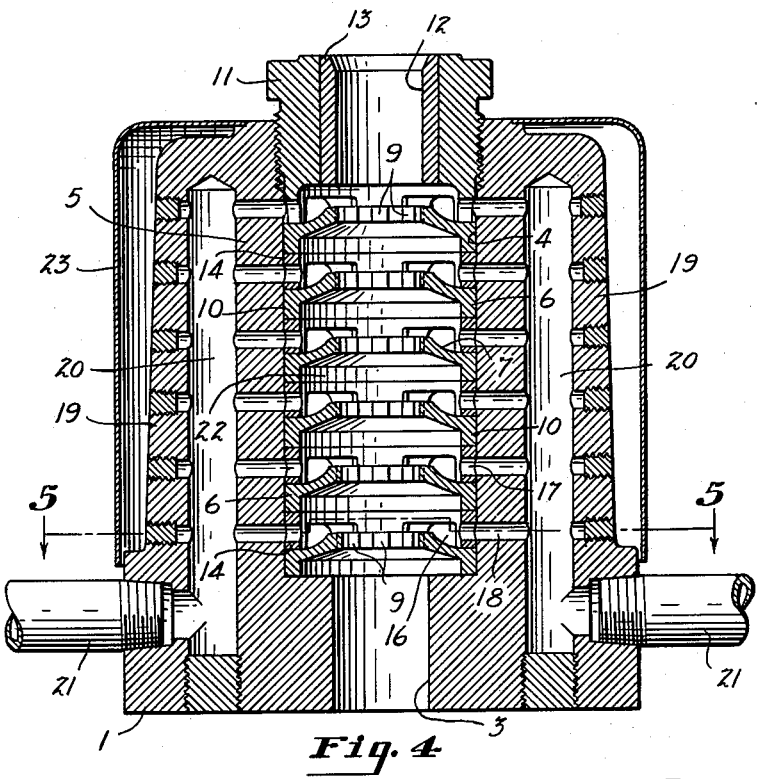
Fig. 4 is a section taken on the line indicated at 4—4 in Fig. 1.

Referring to the accompanying drawings, the device of the present invention includes a broach holder 1 which may be formed of a single block of metal having a flanged base 2 and a central vertical bore 3 opening to the bottom thereof. A counterbore 4 opening to the top of the holder 1 forms a broach receiving chamber, the block being formed to provide an enclosing wall 5 around the broach receiving chamber. A series of annular broaches 6 of cylindrical form fit within the counterbore 4, each of the broaches having an upwardly dished disc-like body portion 7 provided with a central opening 8 and regularly spaced internal teeth 9 which project into the opening 8. The teeth 9 taper downwardly and have interior faces that conform to an upwardly tapering cone so that the teeth have proper clearance for cutting grooves in a work piece that is moved endwise through the broaches, it being understood that the teeth of successive broaches gradually increase in size toward the bottom of the chamber so that each broach enlarges the groove cut by the preceding broaches.

The broaches 6 are preferably of identical construction, each having peripheral spacing flanges 10 which project downwardly from the disc portion 7. The upper end of the counterbore 4 is internally threaded to receive a guide plug 11 which screws into the upper end of the counterbore, the guide plug 11 having an elongated guide bore 12 that is axially alined with the openings 8 of the broaches and the bore 3 in the bottom of the broach holder. The bore 12 may be formed in a hardened steel bushing 13 fitting in the plug 11 and the length of the bore 12 is whatever may be necessary to prevent bending of the shaft being broached by endwise pressure exerted thereon by means of a hydraulic plunger or other suitable pressure applying means. In order to increase the size of the chambers between the broaches 6, spacing rings 14 may be provided which are cylindrical in form to fit in the counterbore 4, the rings 14 being of the same thickness as the depending flanges 10 and forming extensions of the flanges 10.

Each spacing ring 14 rests upon the top of a broach 6 and provides a ledge upon which the spacing flange 10 of the superimposed broach rests. Each spacing ring is provided with a plurality of elongated notches 15 that are adapted to register with circumferentially elongated openings 16 formed in the wall 5 and between the notches 15 the rings 14 are provided with holes 17 that are adapted to register with horizontal passages 18 formed in the wall 5. The passages 18 and openings 17 serve to deliver a liquid coolant into each of the chambers formed between successive broaches 6 and the passages 18 and openings 17 are arranged to deliver the liquid tangentially into the chambers so that the liquid has a whirling motion within the chamber. Means is provided for delivering liquid under pressure into the chambers through the passages 18 to cause a large volume of liquid to pass through each of the chambers and whirl about the shaft being broached and to contact with the broaches forming the top and bottom walls of the chamber so that heat is rapidly extracted from the broaches and the work. The elongated notches 15 and openings 16 permit the liquid carrying chips cut from the work to discharge freely from the cooling chambers.

The walls 5 of the holder 1 are provided with diametrically opposite thickened portions 19 in which vertical passages 20 are formed with communicate with each of the horizontal passages 18. Pipes 21 leading to a suitable coolant supply pump are connected to the passages 20. An external shield 23 is preferably provided around the wall 5 and spaced radially therefrom to provide an annular passage for discharge of coolant.

Figure 5:
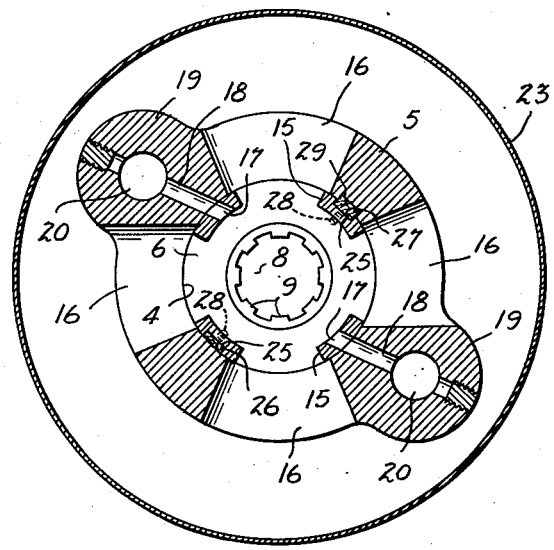
Fig. 5 is a horizontal section taken on the line indicated at 5—5 in Fig. 4.
Figure 6:
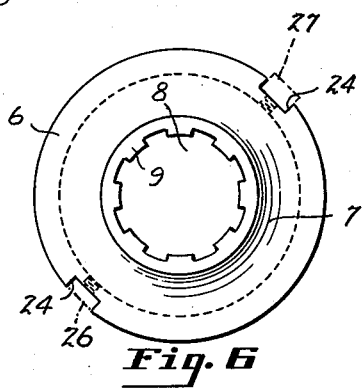
Fig. 6 is a top plan view of one of the annular broaches.
Figure 7:
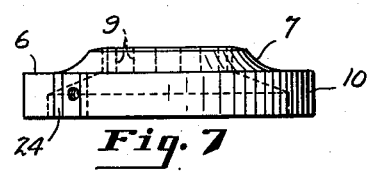
Fig. 7 is a side elevation of the broach shown in Fig. 6.

The broaches 6 and rings 7 are preferably assembled and secured together as a unit for insertion into the holder 1 and removal therefrom. As shown in Figs. 5 and 6, the broaches 6 are provided with diametrically disposed axially extending grooves 24 and the rings 14 are provided with similar grooves 25 adapted to register with the grooves 24. Positioning bars 26 and 27 are secured in the alined grooves 24 and 25 of the broaches 6 and rings 14 and are secured to the rings and broaches by means of screws 28. The bar 27 is preferably formed to fit in the grooves 24 and 25 with its external face flush with the cylindrical surfaces of the rings and broaches. The opposite bar 27 may be of a thickness slightly greater than the depth of the grooves 24 and 25 so as to project past the cylindrical surfaces of the broaches and rings to fit in an axially extending groove 29 formed upon the interior of the counterbore 4 so that both the notches 14 and openings 16 of the spacing rings are correctly registered with the openings 16 and passages 18 of the wall 5. The stack of broaches is held in place in the chamber by any suitable means such as the guide plug 11 which may clamp the stack of broaches against the bottom of the counterbore 4.

It is to be understood that variations and modifications of the specific devices herein shown, and described for purposes of illustration, may be made without departing from the spirit of the invention.

What I claim is:

1. In a broaching machine, a broach stack having disc-like body portions provided with central internally toothed openings and peripheral spacing portions forming substantially internally cylindrical walls of greater diameter than said openings that enclose cooling chambers between said disc-like portions, said spacing portions having inlet and discharge openings to each of said chambers, said inlet openings being tangentially disposed and said outlet openings being circumferentially elongated, and means for delivering a liquid coolant under pressure through the tangential inlets into the cooling chambers to impart a whirling motion to the liquid in the chambers to wash out chips through the discharge openings.

2. In a broaching machine, a broach holder provided with a broach receiving chamber having an enclosing wall and an end wall provided with a central opening, said enclosing wall having axially spaced pairs of diametrically opposite inlet ports and circumferentially elongated discharge openings circumferentially alined with said ports, annular internal tooth broaches fitting within said enclosing wall and disposed in axially spaced relation, said broaches being positioned between successive pairs of inlet ports, and means for delivering a liquid coolant under pressure through said inlet ports into the spaces between said broaches.

3. In a broaching machine, a broach holder provided with a broach receiving chamber having a substantially cylindrical enclosing wall and an end wall provided with a central opening, said enclosing wall having axially spaced pairs of diametrically opposite tangentially disposed inlet ports and circumferentially elongated discharge openings circumferentially alined with said ports, annular internal tooth broaches fitting within said enclosing wall, spacers between successive broaches providing cooling chambers, each open to a pair of said inlet ports and the discharge openings circumferentially aligned therewith and means for delivering a liquid coolant under pressure through said inlet ports into said cooling chambers.

4. In a broaching machine, a broach holder provided with a broach receiving chamber having a circumferential wall provided with axially spaced inlet ports and circumferentially elongated discharge openings circumferentially alined with said ports, said chamber having an end wall with a central opening, a guide member forming the opposite end wall of said chamber, said guide member having an axially elongated guide opening alined with said central opening, a series of axially spaced broaches mounted in said chamber between the end wall and guide member, said broaches having openings alined with the end openings to said chamber and having internal cutting teeth, substantially internally cylindrical spacers of an internal diameter greater than said openings interposed between peripheral portions of said broaches, said spacers being provided with openings that register with said ports and elongated openings that register with said openings of the circumferential wall, and means for delivering a liquid coolant under pressure through said ports into said cooling chambers.

5. In a broaching machine, a broach holder provided with a broach receiving chamber having a circumferential wall provided in axially spaced portions thereof with a pair of diametrically opposite tangentially disposed inlet ports and circumferentially elongated discharge openings between the inlet ports of each pair, a series of annular internal tooth broaches in said chamber, said broaches being spaced axially and positioned between said pairs of ports to provide cooling chambers between them, and means for delivering a liquid coolant under pressure through said ports into said chambers to cause said liquid to whirl about the work and to wash chips through said elongated wall openings.

6. In a broaching machine, a stack of annular internal tooth broaches having cylindrical peripheries, each provided with diametrically opposite axially extending grooves, the grooves of all the broaches being alined, bars fitting in the alined grooves, one of said bars having its outer surface flush with the cylindrical peripheries of the broaches, the other of said bars extending past the cylindrical peripheries of the broaches and means for detachably securing said bars to certain of said broaches.

7. In a broaching machine, a stack composed of annular internal tooth broaches with annular spacers between them, said broaches and spacers having cylindrical peripheries of the same diameter, said broaches and spacers having diametrically opposite alined grooves, said spacers having circumferentially spaced openings, bars fitting in said grooves and extending substantially the full length of the stack, and means for detachably securing said bars to the end broaches of the stack to hold the broaches and spacers in assembled relation.

8. In a broaching machine a broach holder having a central bore opening to one end and a counterbore opening to the opposite end and forming a broach receiving chamber, said holder having axially spaced tangential inlet ports opening to said chamber and discharge openings circumferentially alined with said ports, a stack of annular broaches in said chamber, said broaches having cylindrical peripheries fitting in said counterbore, annular spacing means interposed between peripheral portions of said broaches and formed to provide openings alined with said ports and openings of the holder, a guide member in the form of a plug secured in the open end of said counterbore and serving to clamp said broaches against the bottom of the counterbore, said guide member having an axially elongated central bore for guiding bar stock into the broach openings.

LUDWIG J. SCHINNERER.

REFERENCES CITED

The following references are of record in the file of this patent:

UNITED STATES PATENTS

| Number | Name | Date |
| --- | --- | --- |
| 582,081 | Newton | May 4, 1897 |
| 2,078,632 | Halborg | Apr. 27, 1927 |

FOREIGN PATENTS

| Number | Country | Date |
| --- | --- | --- |
| 408,992 | Great Britain | Apr. 23, 1934 |
| 419,276 | Great Britain | Nov. 8, 1934 |